Nov. 8, 1966  C. MARCHIS  3,283,619
FACING HEAD
Filed Aug. 13, 1964
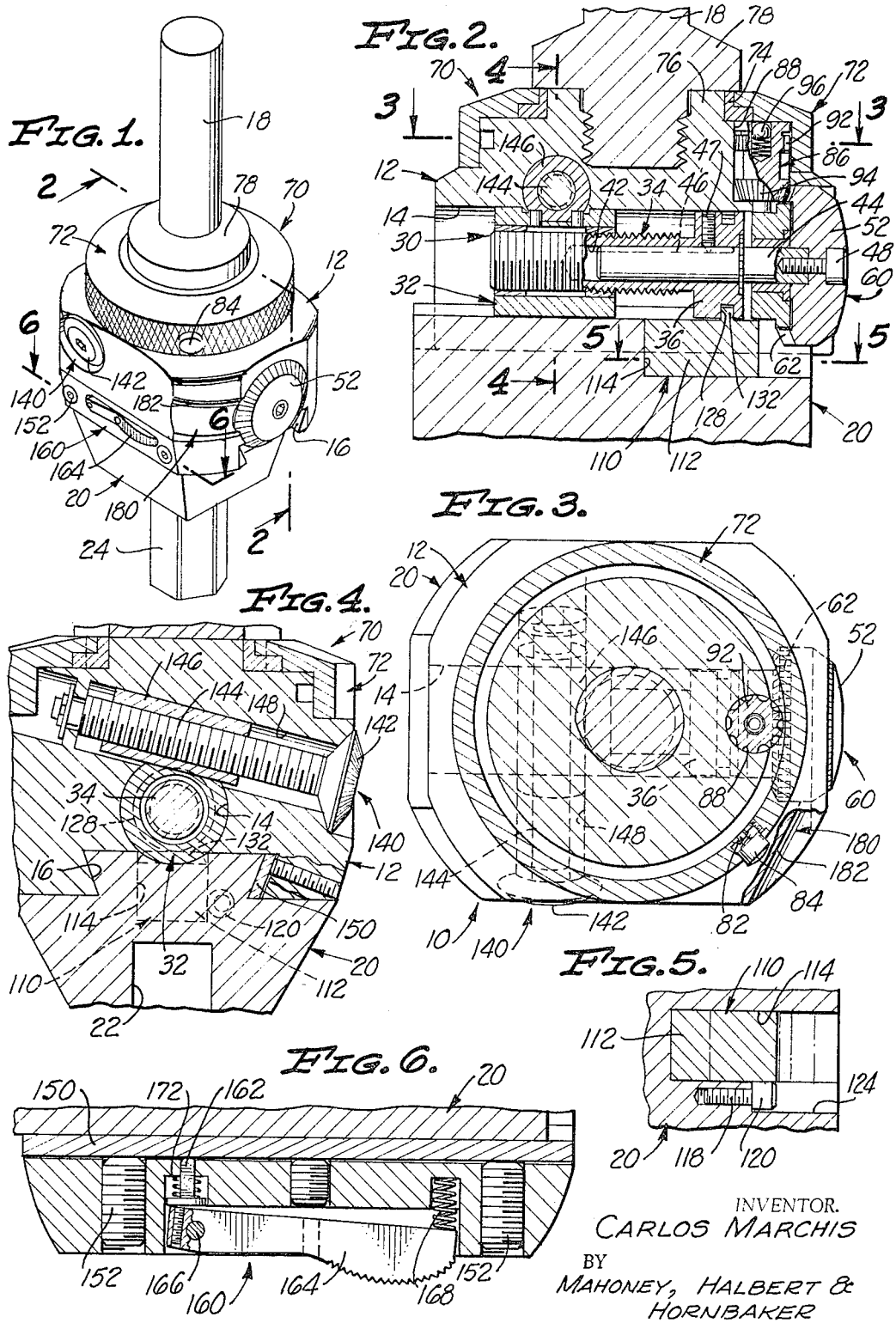
INVENTOR.
CARLOS MARCHIS
BY
MAHONEY, HALBERT &
HORNBAKER
ATTORNEYS

United States Patent Office 3,283,619
Patented Nov. 8, 1966

3,283,619
FACING HEAD
Carlos Marchis, Santa Monica, Calif., assignor of ten percent to Thomas P. Mahoney, Los Angeles, Calif., and five percent to Roberto Marchis, Santa Monica, Calif.
Filed Aug. 13, 1964, Ser. No. 389,427
10 Claims. (Cl. 77—58)

This invention relates to a facing head and, more particularly, to a facing head adapted to be utilized in conjunction with rotary machine tools such as boring mills, to perform facing operations on a workpiece.

Conventional facing heads are of extremely complex construction and are, consequently, relatively high in cost. In addition, they are confined to the performance of the facing operation and cannot function interchangeably as boring heads.

It is, therefore, an object of my invention to provide a facing head which is of relatively simple construction including a minimum number of component parts and, consequently, of considerably lower cost than conventional facing heads.

An associated object of the invention is the provision of a facing head which may be utilized, interchangeably, as a boring head.

In disclosing the facing head of my invention I have incorporated therein the coarse and fine adjustment means which constitute the subject matter of my co-pending application Serial No. 194,316, filed May 14, 1962, entitled "Boring Head." However, it is not necessary that the fine adjustment means be incorporated in the facing head of my invention but such incorporation greatly facilitates the utilization of the facing head both as a facing head and as a boring head as well be clear from the description thereof appearing hereinbelow.

Another object of my invention is the provision of a facing head incorporating a body and a tool mount which is longitudinally movable in said body by adjustment means having an actuator connected thereto for causing longitudinal movement of said tool mount in said body. Operatively connected to said adjustment means through said actuator is a ring mounted on the body and incorporating an intermittently actuatable dog adapted to cause movement of said actuator to accomplish intermittent adjustment of the tool mount in said body through the aforesaid adjustment means during rotation of the body in the associated boring tool.

A further object of my invention is the provision of a facing head of the aforementioned character wherein the operative connection between the actuating ring, which will be referred to hereinbelow as a second actuator, is constituted by a simple gear train between the actuator for the adjustment means, which will be referred to hereinbelow as the first actuator, and said ring.

Another object of my invention is the provision of an operative connection between said adjustment means and said tool mount constituted by a releasable link, whereby, when said tool mount has been carried to its initial limit of movement in said body, said releasable link can be released from said tool mount to permit the retraction of said adjustment means by the associated first actuator, thus permitting the link to be carried back to its initial position and to be connected, once again, to the tool mount. The adjustment means can then be re-actuated and the length of stroke of movement of the tool mount is thus doubled.

The provision of the releasable link of the aforementioned character greatly enhances the utility of the facing head of the invention since it doubles the range of the facing head without the necessity for relocating a facing tool in the tool mount.

While the releasable link between the adjustment means and the tool mount is described in conjunction with the facing head of the invention, it will be apparent to those skilled in the art that the concept of the releasable link may be applied with equal cogency to boring heads and similar devices and it is not intended that the incorporation of the releasable link between the adjustment means and the tool mount be limited to the particular facing head disclosed herein.

As mentioned previously, the facing head of the invention has incorporated therein the coarse and fine adjustmnet actuators for the adjustment means disclosed in the above referenced patent application and, when the facing head is used as a boring head, it is necessary to sequentially adjust the actuators for the coarse and fine adjustment sequentially. However, in conventional devices such adjustment is difficult because of the fact that the operator cannot view the calibrated heads of the actuator simultaneously.

It is therefore, another object of the invention to provide viewing means in the body of the facing head which will permit the calibrated heads of both the coarse and fine actuators to be simultaneously viewed.

Another object of the invention is the provision of releasable retention means for the gib associated with the tool mount of the facing head which permits the gib to be readily released during adjustment of the tool mount in the body by either the coarse or fine adjustment actuators.

Other objects and advantages of the invention will be apparent from the following specification and the accompanying drawing, which is for the purpose of illustration only, and in which:

FIG. 1 is an isometric view of a facing head constructed in accordance with the teachings of the invention;

FIG. 2 is a vertical, sectional view taken on the broken line 2—2 of FIG. 1;

FIG. 3 is a transverse sectional view taken on the broken line 3—3 of FIG. 2;

FIG. 4 is a vertical, sectional view taken on the broken line 4—4 of FIG. 3;

FIG. 5 is a transverse sectional view taken on the broken line 5—5 of FIG. 2; and FIG. 6 is a transverse sectional view taken on the broken line 6—6 of FIG. 1.

Referring to the drawing, and particularly to FIGS. 1–4 thereof, I show a facing head 10 constructed in accordance with the teachings of my invention and including a body 12 incorporating a transverse bore 14 and a corresponding guideway 16. A mounting post 18 is threadedly engaged in the upper extremity of the body 12 to facilitate the securement of the facing head 10 in an associated machine tool.

Located in the guideway 16 for longitudinal movement with reference to the body 12 is a tool mount 20 which incorporates a tool receiving bore or recess 22 for the reception of a typical facing or cutting tool 24. Located in the bore 14 is adjustment means indicated generally at 30, said adjustment means including a normally immobile nut 32 and an externally threaded shaft 34 having a head 36 thereupon which causes it to assume the general configuration of a bolt.

The shaft 34 incorporates a bore 42 and a cylindrical actuating rod 44 is located in said bore, as best shown in FIG. 2 of the drawing. A keyway 46 is formed in the perimeter of the actuating rod 44 to permit relative longitudinal movement between the shaft 34 and the actuating rod 44, said shaft being operatively connected to said rod by a set screw 47 engaged in said keyway.

Secured to the outer extremity of the actuating rod 44 by means of an allenhead bolt 48 is the calibrated head 52 of a first actuator for the adjustment means 30, said first actuator being constituted by the said calibrated head and the associated actuating rod 44. Rotation of the calibrated head 52 by engagement of the head of the allen bolt is adapted to cause corresponding rotation of the actuating rod 44 and concomitant rotation of the externally threaded shaft 34 to cause the shaft 34 to be advanced into or withdrawn from the correspondingly threaded bore of the nut 32. The first actuator, indicated generally at 60, thus serves to cause coarse adjustment to the tool mount 20 in the guideway 16 in the body 12 in a manner which will be described in greater detail below.

A bevel gear 62 is provided upon the inner surface of the calibrated head 52 of the first actuator 60, as best shown in FIGS. 2 and 3 of the drawing. Of course, it will be obvious to those skilled in the art that, while the bevel gear 62 is formed upon the calibrated head 52 of the first actuator 60, it could be supplied as a separate entity and operatively secured to the inner surface of said head.

A second actuator 70 for the adjustment means 30 is mounted upon the body 12 and includes a ring 72 which encompasses the upper portion of the body 12, as best shown in FIGS. 1–2 of the drawing, said ring including a brass bushing 74 encompassing a corresponding boss 76 on said body to facilitate the relative rotation between said ring and said body. The ring 72 is maintained in operative relationship with the boss 76 by a flange 78 provided on the mounting post 18.

Mounted in the ring 72, as best shown in FIG. 3 of the drawing, is a dog 82 connected to a push button 84 which is spring-biased outwardly to maintain the dog 82 in an operative position.

A gear train 86 is mounted in a vertical bore 88 in the body 12, as best shown in FIGS. 2–3 of the drawing and includes a spur gear 92 formed integrally with a bevel gear 94, said spur gear being engageable by the dog 82 when the dog 82 is biased inwardly by depression of the associated push button 84, in a manner to be described in greater detail below. The compound spur gear 92 and bevel gear 94 are maintained in the associated bore 88 by a spring and ball combination 96, as best shown in FIG. 2 of the drawing, the ball engaging the underside of the ring and maintaining the associated compression spring in a bore provided in the compound gear 92.

The bevel gear 94 engages the corresponding gear 62 provided on the rear surface of the calibrated head 52 of the first actuator 60. Therefore, when the body 12 of the facing head is rotated in an associated machine tool, the ring 72 may be grasped by an operator who, by depressing the push button 84, can cause the dog 82 to be projected into the path of the spur gear 92. Engagement of the dog 82 with the spur gear 92 causes corresponding rotation of the bevel gear 94 to cause concomitant rotation of the gear 62 on the calibrated head 52. Consequent rotation of the drive rod 44 occurs simultaneously with the resultant rotation of the shaft 34 which causes the shaft 34 to be advanced into the associated nut 32 and which causes the tool mount 20 to be operatively connected with the adjustment means through the shaft 34, in a manner to be described in greater detail below, to advance in the associated guideway 16.

The operative connection between the tool mount 20 and the adjustment means 30 is provided by a releasable link 110 constituted, as best shown in FIGS. 2 and 4–5 of the drawing, by an elongated, rectangular, connecting block 112 which is located in a corresponding recess 114 in the tool mount 20. The block 112 is maintained in releasable relationship with the tool mount 20 by an allenhead bolt 118 having an eccentric head 120 which engages the side of the block 112 to lock the block 112 in the receptacle 114 therefor. Access to the block 112 and the head of the allen bolt 118 may be had through a passage 124, as best shown in FIG. 5 of the drawing, to permit the head 120 to be rotated to release the block 112 from the head 120 and to permit the block 112 to be shifted outwardly in the recess 114 by reverse rotation of the calibrated head 52 to which the block is connected by means of the head 36 provided on the shaft 34.

The head 36 has an annular slot 128 which receives a corresponding lug 132 provided on the upper surface of the block 112, as best shown in FIG. 2 of the drawing, so that the block 112 constituting the releasable link 110 operatively connects the tool mount 22 to the adjustment means 30 by means of the head 36 of the shaft 34.

A third actuator 140 is provided in the body 12 of the facing head 10 and includes a calibrated head 142 which has a screw 144 secured thereto and engaged with a traveling block 146 to cause longitudinal movement of the same in a bore 148 oriented transversely of the bore 14, as best shown in FIGS. 2–4 of the drawing. The bore 148 is angularly oriented to reduce the overall height of the body 12 and the operation of the third actuator 140 is to cause the movement of the immobile nut 32 as described in my above referenced co-pending patent application to cause extremely fine increments of movement of the adjustment means and, consequently, the tool mount 20.

It is not necessary that the third actuator 140 be provided if it is not necessary to provide for fine adjustment of the mounting block 20 in the guideway 16.

Also incorporated in the facing head and adapted to be used with equal facility in a boring head is an adjustable gib 150 which is adapted to be urged into locking engagement with the side of the mounting block 20, as best shown in FIGS. 4 and 6 of the drawing. Set screws 152 normally serve to urge the gib 150 against the mounting block 20. However, I provide a releasable locking means 160 constituted by an outwardly spring-biased pin 162 which is normally urged inwardly by a trigger 164 pivoted inwardly about its axis 166 by a compression spring 168. By pressing inwardly on the right-hand extremity of the gear trigger 164 the pin 162 is released to permit the associated spring 172 to urge it outwardly and release the gib 150 to permit free movement of the mounting block 20 adjustment by either the first or third actuator heads 52 and 142 respectively.

Since the first actuator head 52 and the second actuator head 142 are disposed on portions and sides of the body 12 remote from each other, as best shown in FIGS. 1 and 3 of the drawing, viewing means 180 constituted by an elongated slot 182 in the body adjacent the actuating head 52 for the first actuator 60 is provided whereby the calibrations on the first actuator head 52 and the third actuator head 142 may be simultaneously viewed to eliminate the necessity for the operator moving back and forth to adjust the respective actuator heads.

I thus provide by my invention a facing head which is characterized by its relatively low cost to manufacture, by its ease of utilization and by the accuracy with which it operates. In addition, the facing head of my invention is capable of being utilized as a boring head since it incorporates at least one and, if desired, two, boring head adjustments. In addition, the facing head of the invention incorporates a link between the adjustment means and the tool mounting block which permits an unusually large movement of the tool mounting block to be achieved.

This is accomplished by releasing the length and retracting the first actuator to permit an additional stroke of the adjustment means to be achieved and thus permitting additional movement of the mounting block.

I claim:

1. In a facing head, the combination of: a body having an elongated guideway therein; a tool mount supported in said guideway for longitudinal movement in respect to said body; adjustment means operatively connecting said tool mount to said body for moving said tool mount longitudinally in said guideway; a first actuator connected to said adjusting means for initially adjusting said tool mount in said guideway; and a second actuator connected by said first actuator to said adjustment means for intermittently energizing said adjustment means to cause movement of said tool mount during a facing operation.

2. In a facing head, the combination of: a body having an elongated guideway therein; a tool mount supported in said guideway for longitudinal movement in respect to said body; adjustment means operatively connecting said tool mount to said body for moving said tool mount longitudinally in said guideway; a first actuator connected to said adjustment means for initially adjusting said tool mount in said guideway; and a second actuator connected to said adjustment means for intermittently energizing said adjustment means to cause movement of said tool mount during a facing operation, said second actuator being constituted by a ring mounted on said body for rotation relative to said body, said ring being connected to said adjustment means by a gear train including said first actuator.

3. In a facing head, the combination of: a body having an elongated guideway therein; a tool mount supported in said guideway for longitudinal movement in respect to said body; adjustment means operatively connecting said tool mount to said body for moving said tool mount longitudinally in said guideway; a first actuator connected to said adjustment means for initially adjusting said tool mount in said guideway; and a second actuator connected to said adjustment means for intermittently energizing said adjustment means to cause movement of said tool mount during a facing operation, said second actuator being constituted by a ring mounted on said body for location relative to said body, said ring being connected to said adjustment means by a gear train including said first actuator, said gear train including a normally inoperative dog mounted in said ring for actuating said gear train.

4. In a facing head, the combination of: a body having a guideway therein; a tool mount located in said guideway for longitudinal movement with respect to said body; adjustment means in said body operatively connected to said tool mount for causing said longitudinal movement of said tool mount in said guideway; a first actuator for said adjustment means for causing longitudinal movement of said tool mount in said guideway; a second actuator for intermittently actuating said adjustment means to cause intermittent movement of said tool mount; and a releasable connecting link between said first and second actuators and said tool mount for releasing said tool mount from said adjustment means at the end of initial movement of said adjustment means to permit additional movement of said tool mount by said adjustment means.

5. In a facing head, the combination of: a body having a guideway therein, said body incorporating viewing means in one extremity thereof; a tool mount located in said guideway for longitudinal movement with respect to said body; adjustment means in said body operatively connected to said tool mount for causing said longitudinal movement of said tool mount in said guideway; a first actuator for said adjustment means for causing longitudinal movement of said tool mount in said guideway, said first actuator being located adjacent said viewing means; a second actuator for intermittently actuating said adjustment means to cause intermittent movement of said tool mount; and a third actuator mounted in said body at a point remote from said first actuator, said third actuator being connected to said adjustment means to adjust said tool mount in said body in finer increments than said first and second actuators, said viewing means permitting the simultaneous perception of said first and third actuators so that an operator may view the same simultaneously during the adjustment of said tool mount in said body.

6. In a facing head, the combination of: a body having an elongated guideway therein; a tool mount supported in said guideway for longitudinal movement in respect to said body; adjustment means operatively connecting said tool mount to said body for moving said tool mount longitudinally in said guideway; an actuator connected to said adjusting means for adjusting said tool mount in said guideway; a gib located in said guideway for maintaining said tool mount in a predetermined position of adjustment with respect to said body; and releasable means for maintaining said gib against said tool mount located in said body, said releasable means including a locating pin and a trigger engageable with said pin for releasing said pin from operative engagement with said gib.

7. In a facing head, the combination of: a body having a guideway therein; a tool mount located in said guideway for longitudinal movement therein; adjustment means secured to said tool mount for causing longitudinal adjustment of said tool mount in said guideway, said adjustment means including a nut held against movement in said body and a bolt threadedly engaged in said nut; a rotatable actuator mounted in said body and secured to said bolt for rotating said bolt; said rotatable actuator having a gear thereupon; a rotatable ring mounted on said body in encompassing relationship therewith, said rotatable ring having an intermittently operable dog mounted therein; and a gear train connecting said ring to said gear on said actuator operable by said dog to cause rotation of said actuator and corresponding actuation of said adjustment means.

8. In a facing head, the combination of: a body having a bore therein and a guideway adjacent said bore; a tool mount mounted in said guideway in proximity to said bore; adjustment means located in said bore including a nut held against movement in said bore and a threaded rotatable shaft engageable with said nut, said shaft being operatively connected to said tool mount to cause the adjustment thereof in said guideway when said shaft is rotated to cause it to move in said bore and said nut; an actuator for said adjustment means mounted in said body, said actuator having a gear operatively connected thereto; a ring encompassing said body in proximity to said actuator, said ring incorporating an intermittently actuatable dog; and a gear train in said body for connecting said ring to said actuator, said gear train being actuatable by said dog and operatively connected to said gear of said actuator.

9. In a facing head, the combination of: a body having a bore therein and a guideway adjacent said bore; a tool mount mounted in said guideway in proximity to said bore; adjustment means located in said bore including a nut held against movement in said bore and a threaded rotatable shaft engageable with said nut, said shaft being operatively connected to said tool mount to cause the adjustment thereof in said guideway when said shaft is rotated to cause it to move in said bore and said nut; an actuator for said adjustment means mounted in said body, said actuator having a gear operatively connected thereto; a ring encompassing said body in proximity to said actuator, said ring incorporating an intermittently actuatable dog; a gear train in said body for connecting said ring to said actuator, said gear train being actuatable by said dog and operatively connected to said gear of said actuator; and a releasable link interposed between said rotatable shaft and said tool mount to constitute the operative connection between said tool mount and said adjustment means.

10. In an adjustable head for a cutting tool, the combination of: a body having a guideway therein; adjustment means mounted in said body in proximity to said guideway; an actuator operatively connected to said adjustment means for causing the actuation thereof; and a releasable link between said adjustment means and said tool mount for operatively connecting said tool mount to said adjustment means and for permitting said adjustment means to be released from said tool mount so that said adjustment means may be retracted without corresponding movement of said tool mount.

(References on following page).

References Cited by the Examiner

UNITED STATES PATENTS 2,209,867  7/1940  Wohlhaupter.

FOREIGN PATENTS 1,082,481  5/1960  Germany.

OTHER REFERENCES

Publication: Karl A. Neise Catalog; "there is a Wohlhaupter masterhead for every machine size," received in Patent Office May 1, 1958; copy available in Group 341, class 77—58.36 (6 pp.).

WILLIAM W. DYER, JR., *Primary Examiner.*

G. A. DOST, *Assistant Examiner.*